(12) United States Patent
Culley

(10) Patent No.: US 6,341,568 B1
(45) Date of Patent: Jan. 29, 2002

(54) EXPANDABLE STINGER PLANTER

(76) Inventor: Daniel A. Culley, 128 Davis Hollow, Dayton, WA (US) 99328

( * ) Notice: Subject to any disclaimer, the term of this patent is extended or adjusted under 35 U.S.C. 154(b) by 0 days.

(21) Appl. No.: 09/635,829

(22) Filed: Aug. 9, 2000

Related U.S. Application Data

(63) Continuation-in-part of application No. 09/338,322, filed on Jun. 22, 1999, now Pat. No. 6,158,362.

(51) Int. Cl.$^7$ .............................................. A01C 11/00
(52) U.S. Cl. ........................ 111/117; 111/115; 111/101; 111/102; 37/406; 414/912
(58) Field of Search ................................ 111/117, 102, 111/104, 106, 115, 200, 919, 101; 37/403, 406; 414/912; 47/1.01 R, 1.01 F, 1.01 T

(56) References Cited

U.S. PATENT DOCUMENTS

| | | | |
|---|---|---|---|
| 1,077,822 A | | 11/1913 | Engleman |
| 2,891,813 A | | 6/1959 | Inaki |
| 3,176,635 A | | 4/1965 | Mabon |
| 3,558,177 A | * | 1/1971 | Snead |
| 3,765,347 A | | 10/1973 | Tormstrom |
| 3,972,294 A | * | 8/1976 | Grundstrom et al. |
| 3,998,171 A | * | 12/1976 | Lofgren et al. |
| 4,060,043 A | * | 11/1977 | Lofgren |
| 4,067,268 A | | 1/1978 | Lofgren et al. |
| 4,342,270 A | * | 8/1982 | Lofgren et al. |
| 4,920,900 A | | 5/1990 | Clemens |
| 4,941,416 A | | 7/1990 | Faulring |
| 5,024,172 A | * | 6/1991 | Huber |
| 6,158,362 A | * | 12/2000 | Culley |

* cited by examiner

Primary Examiner—Victor Batson
(74) Attorney, Agent, or Firm—Wells, St. Johns, Roberts, Gregory & Matkin

(57) ABSTRACT

An expandable stinger planter is described which includes a base frame and a pivot frame mounted to the base frame for pivotal movement thereon about multiple pivot axes. A stinger comprised of a pair of elongated probes is mounted to the pivot frame and extending to bottom ends. A stinger mounting frame is operatively positioned between the pivot frame and at least one of the elongated probes. An actuator on the stinger mounting frame is operable to shift the bottom ends between a closed position and an open wherein the bottom ends are opened and form a plant discharge opening. An internal plant receiving receptacle within the probes is open to the plant discharge opening at the open position whereby a plant placed in the plant receiving receptacle may be discharged through the plant discharge opening.

22 Claims, 16 Drawing Sheets

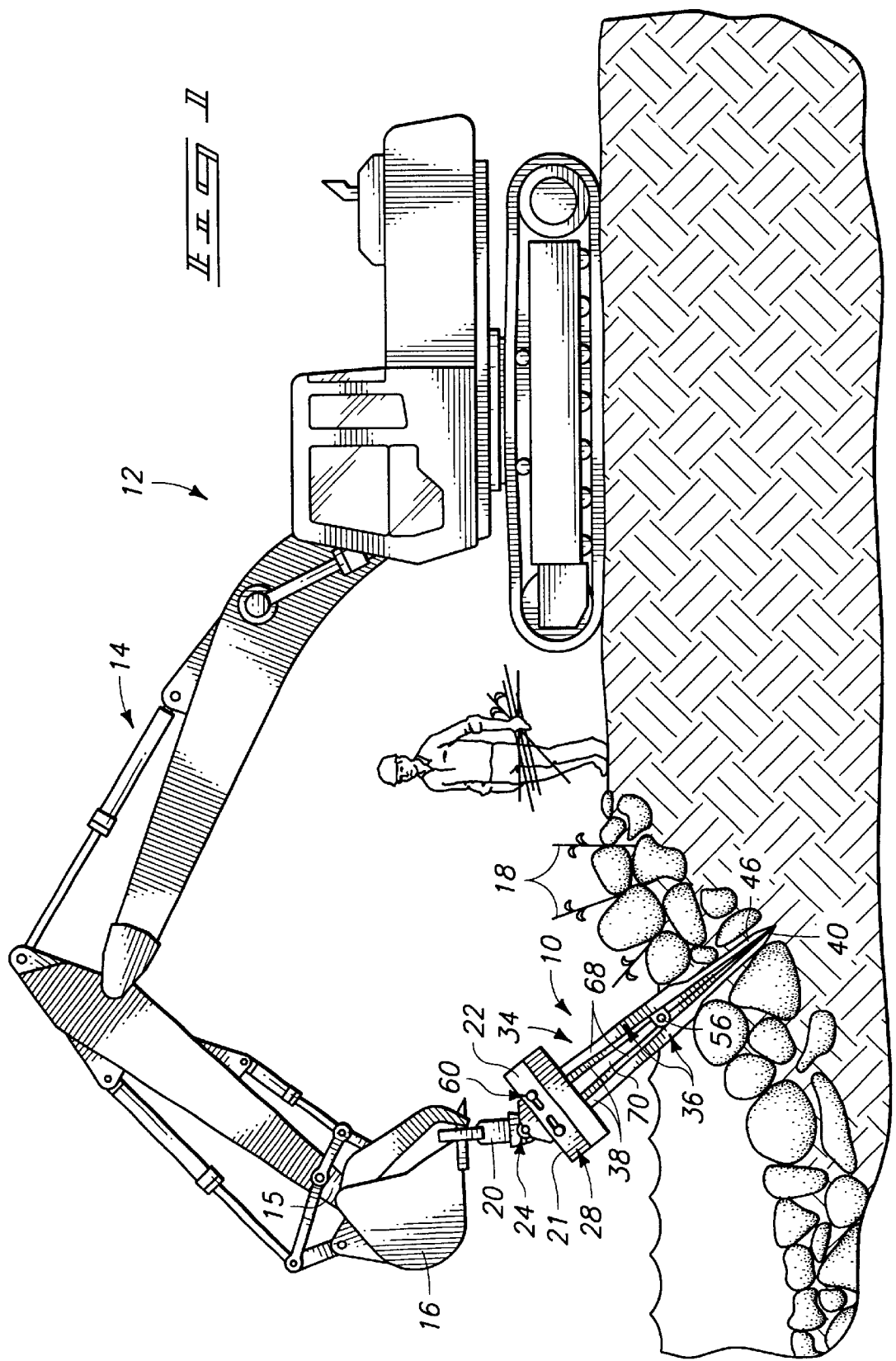

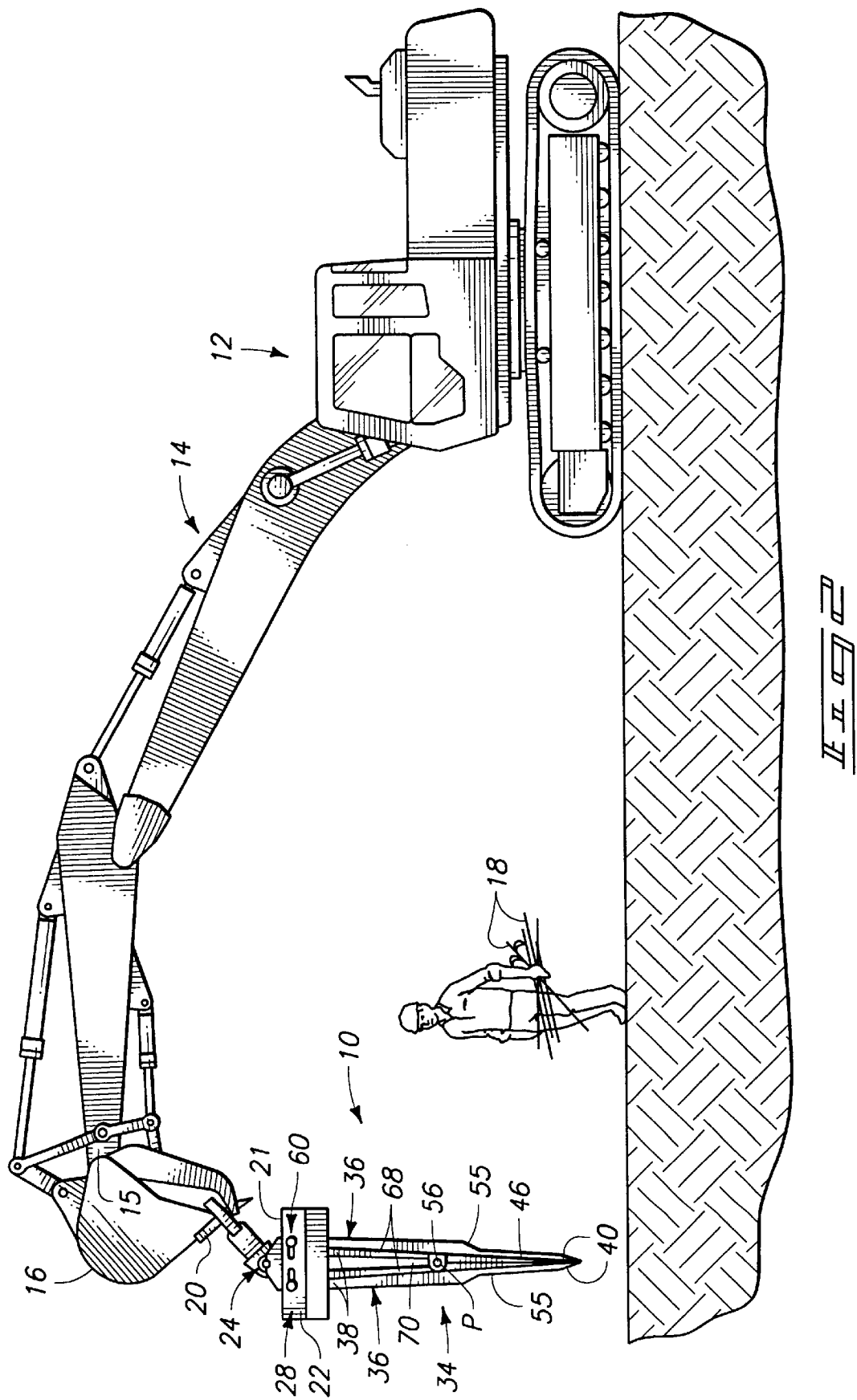

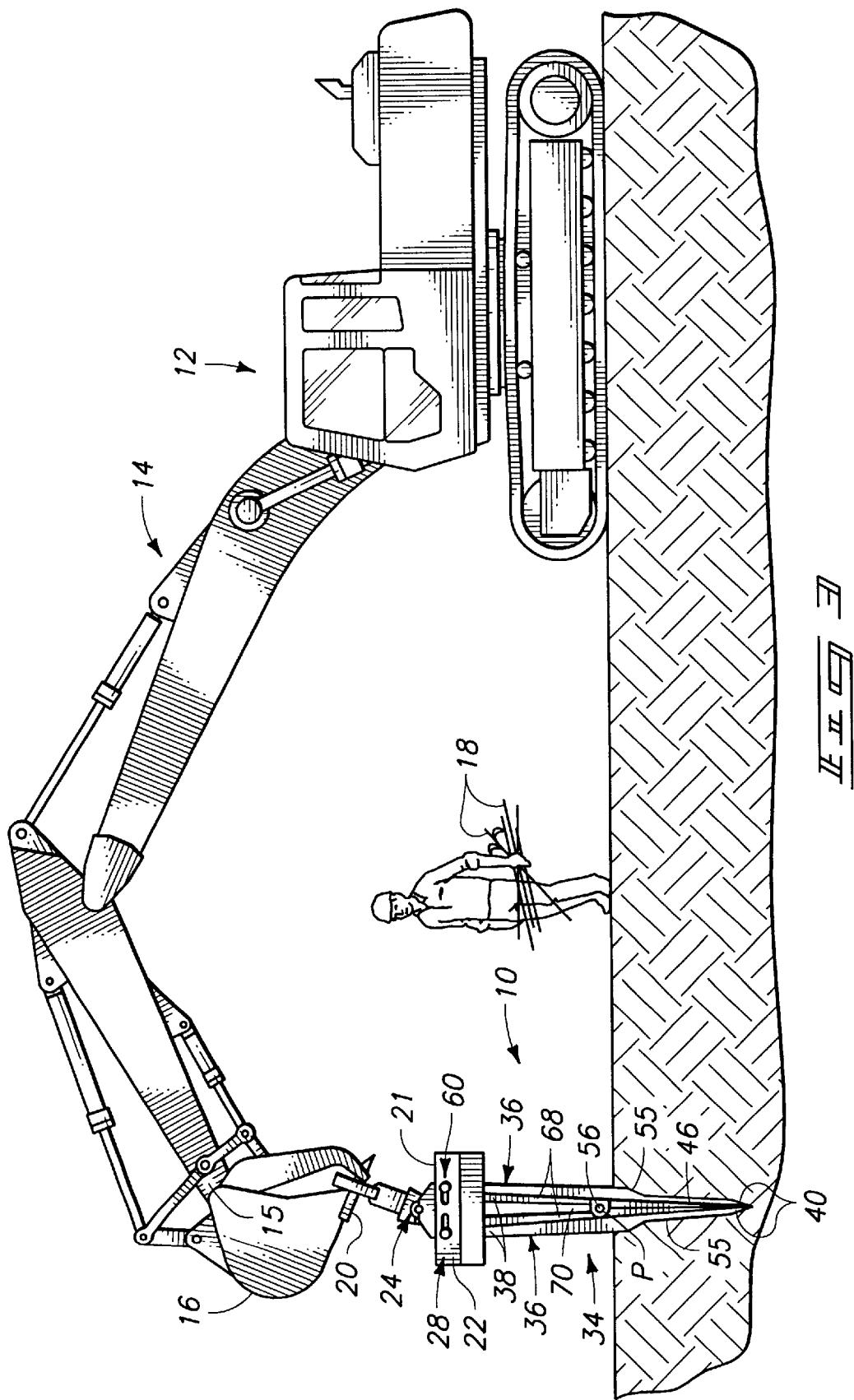

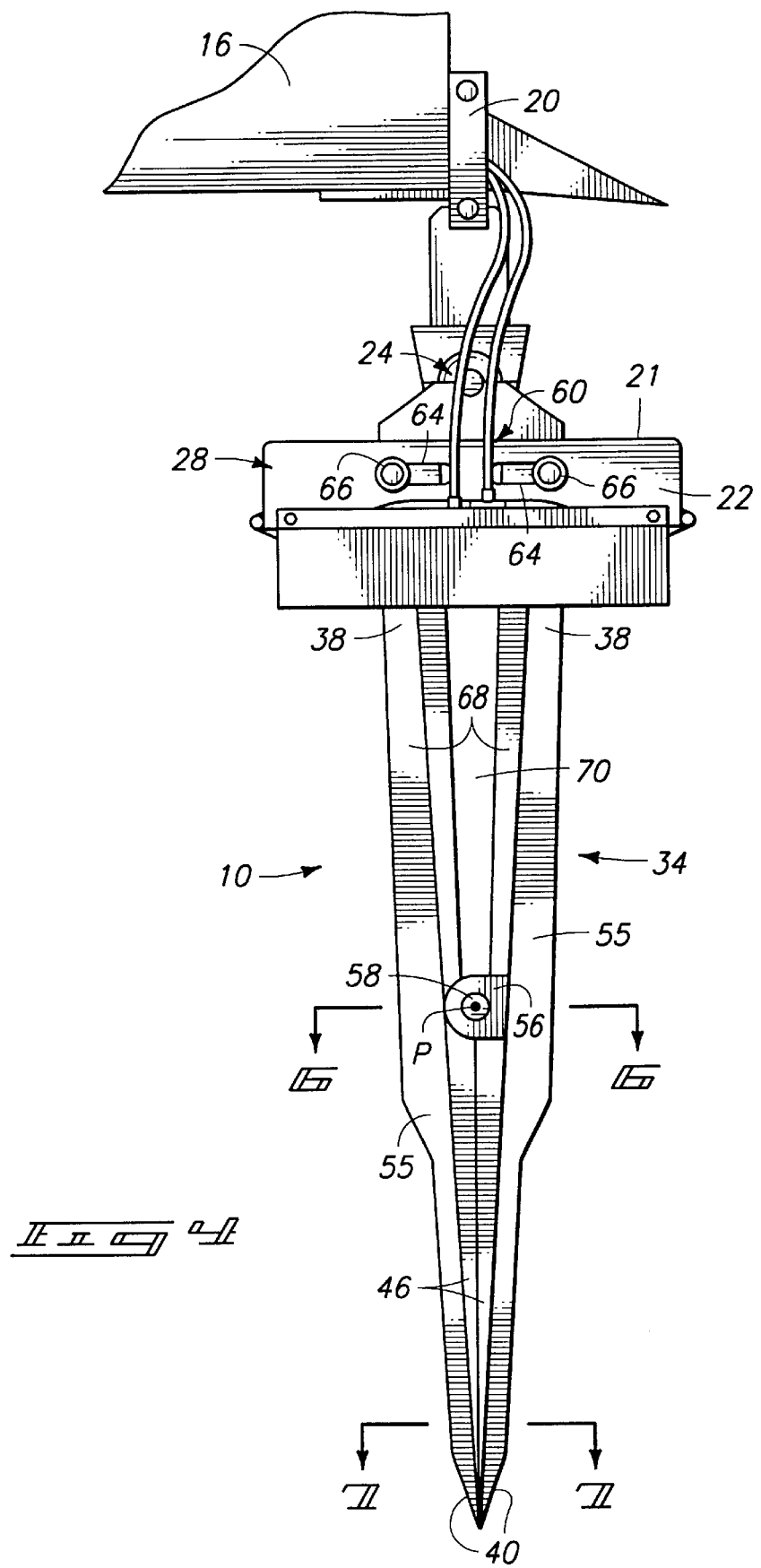

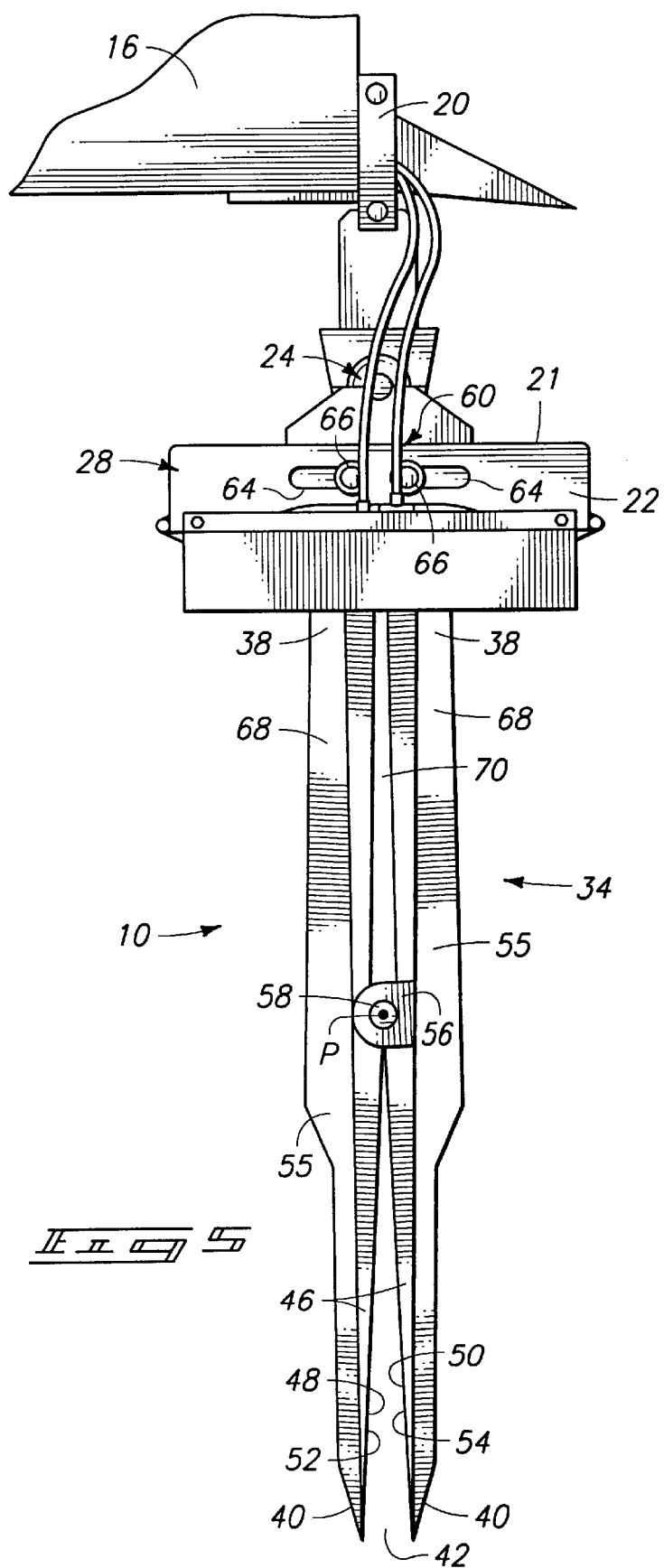

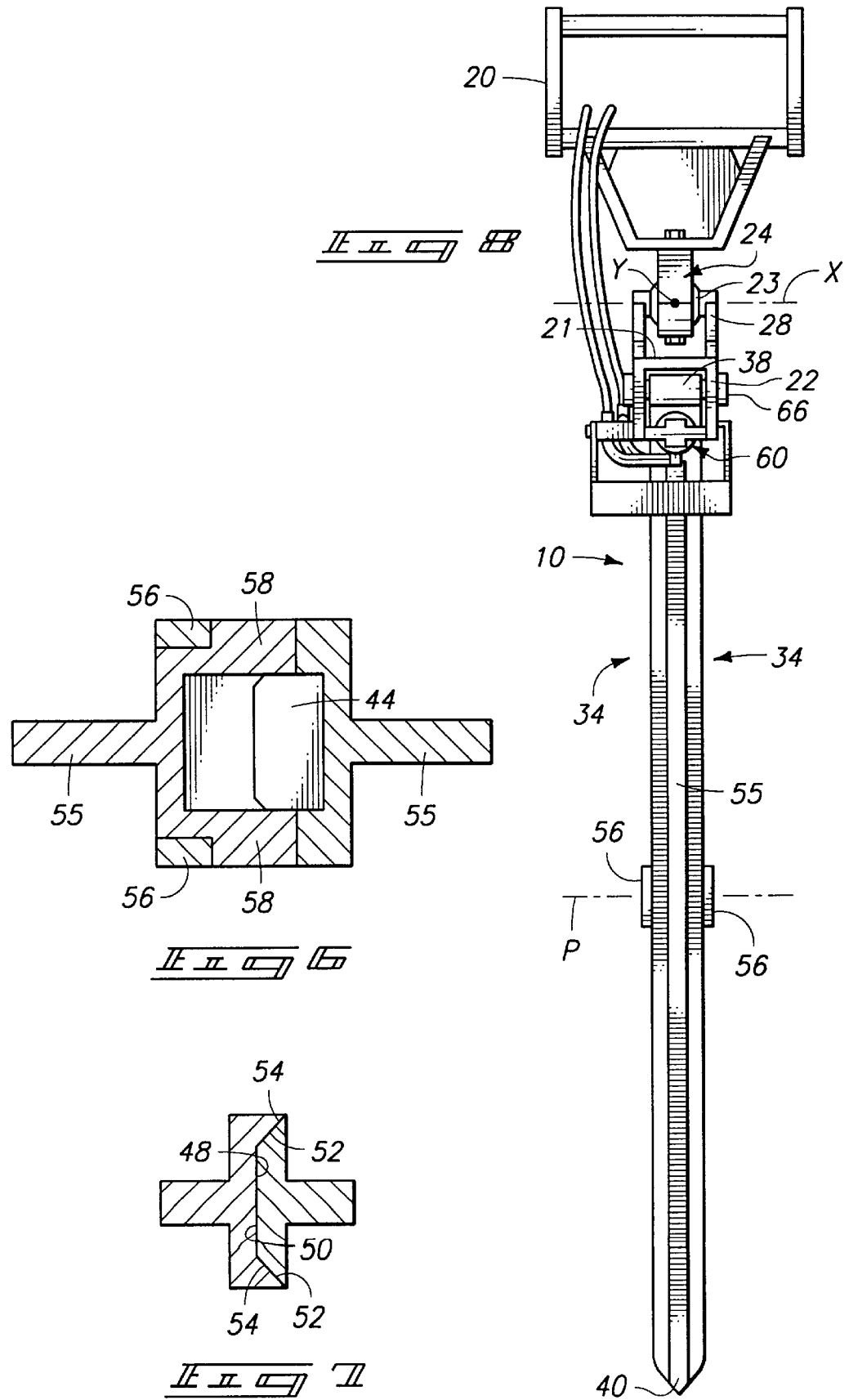

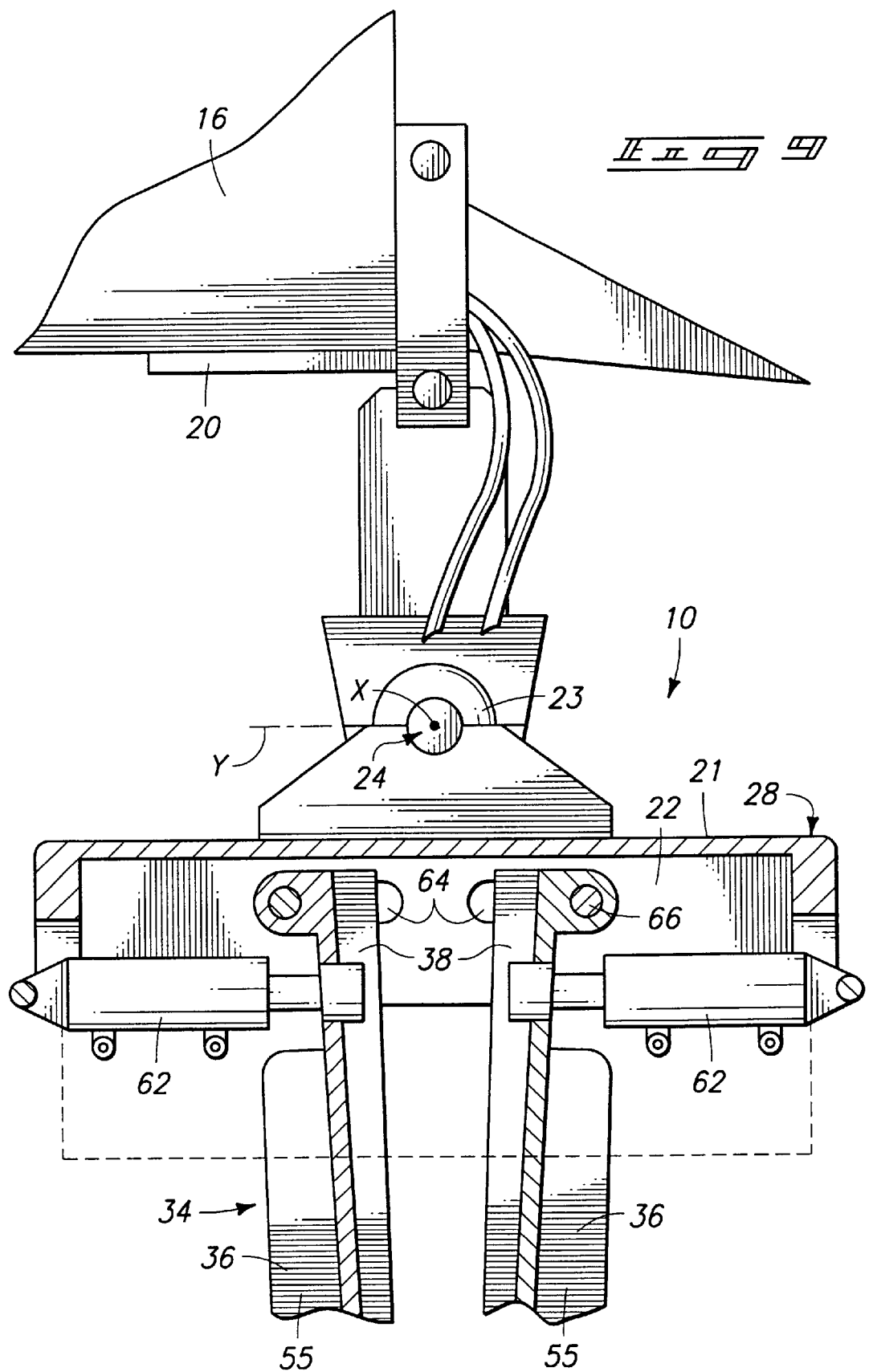

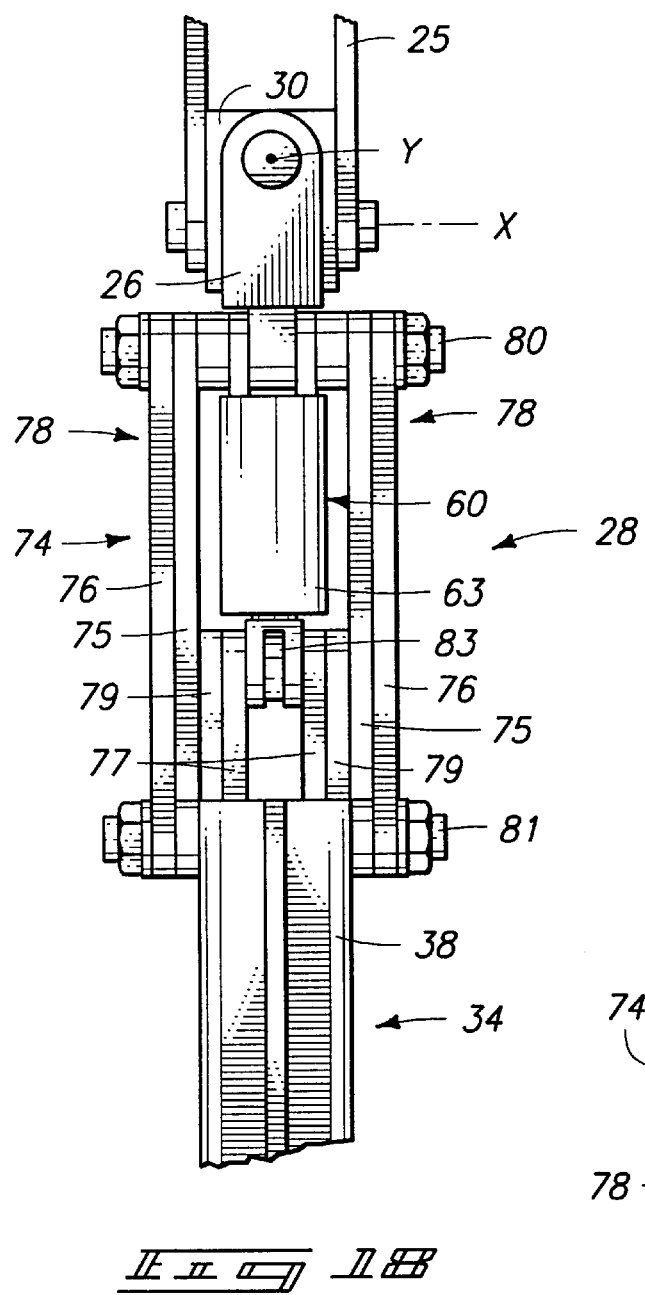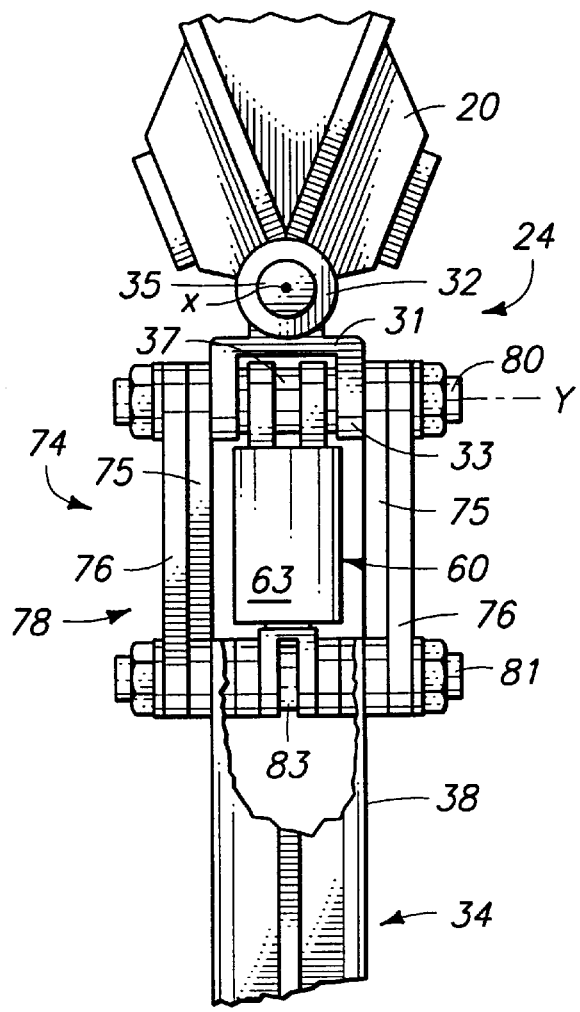
FIG. 18
FIG. 19

EXPANDABLE STINGER PLANTER

RELATED APPLICATIONS

The present application is a continuation-in-part of U.S. patent application Ser. No. 09/338,322 filed on Jun. 22, 1999 now U.S. Pat. No. 6,158,362.

TECHNICAL FIELD

The present invention relates to planting and more particularly to apparatus for performing planting operations.

BACKGROUND OF THE INVENTION

Planting of vegetation in rough terrain has long been a difficult and tedious process. In fact, most planting done on steep embankments or rocky terrain has been accomplished by hand, because mechanized planters are often not capable of negotiating the terrain. Further, bulky planting machinery can damage the surrounding area and seriously compromise the surrounding habitat.

Hand planting in steep, rocky, or otherwise rough terrain is often not successful because the conditions do not permit the planter to dig deep enough to secure the plants. Also riparian areas are typically difficult to plant because the plant stock cannot be secured deeply in the embankment to prevent high water from washing the plants away.

Re-planting vegetation along riparian ways that have been denuded by flooding is ecologically desirable, not only to bolster the shorelines against erosion, but also to re-establish fish and wildlife habitat. Still, it is difficult and sometimes seemingly impossible to successfully plant such areas. Shallow rooted whips of willow, cottonwood and the like are easily washed away at high water, or become easy forage for beaver and deer, so strenuous hand planting operations in such areas do not often result in an acceptable percentage of surviving plants.

Even flat fertile areas can be difficult to re-plant. For example, closely spaced stumps in clear cut areas will often prevent the use of mechanized planting, so expensive hand planting is often the only process available. Further, the planting media may be bound with roots, rocks, or hard soil, frustrating hand planting processes.

Another problem faced in mechanized and hand planting operations, is that planting dibbles, shovels, picks and the like will often leave a hole with a packed wall caused by the tool wedging into the soil. This "shear wall" will hamper proper dispersal of roots and often results in poor or unsuccessful growth.

A present and growing need is therefore realized for a mechanized planter that will reduce, if not eliminate, the need for hand planting in difficult areas. There is also a need for a mechanized planter that will function to plant at a much greater depth than has yet been feasible in hand or mechanized planting operations, without creating the "shear wall" effect.

As a solution to the above problems, the present invention provides a mechanized stinger planter that can be attached to an excavator boom for remote operation at various angles to the surrounding terrain, so difficult terrain can be planted from adjacent accessible areas.

The present planter may be attached to the bucket end of an excavator boom and used by the excavator operator for deep planting operations that are best used for plants such as whips (tree cuttings) or root crop (such as tree seedlings) in a manner intended to avoid wash out and damage from animals. Such planting may be done at locations in a radius from the excavator (within the boom reach) in terrain that would not be otherwise accessible to other mechanized planters.

The present planter may also operate to minimize or eliminate "shear wall" packing of adjacent soil in planting holes, a problem typically faced when dibbles are used for hole formation. The present planter includes probes that avoid "shear wall" packing and that will allow loose soil backfill to fill the openings produced by the probes and thereby promote healthy plant growth.

The above and still further details may become apparent from the following description which, taken with the accompanying drawings, disclose the best presently known mode of carrying out the present invention.

BRIEF DESCRIPTION OF THE DRAWINGS

Preferred embodiments of the invention are described below with reference to the following accompanying drawings.

FIG. 1 is a side elevation view of an excavator mounting a first preferred form of the present stinger planter driven at an angle in rocky riparian planting media;

FIG. 2 is a side elevation view showing the stinger planter positioned above the ground surface;

FIG. 3 is a view similar to FIG. 2 only showing the stinger planter driven into the ground planting media;

FIG. 4 is an enlarged side elevation view of the preferred stinger planter in a closed position;

FIG. 5 is a view similar to FIG. 4 only showing the preferred stinger probes in an open position;

FIG. 6 is an enlarged sectional view taken substantially along line 6—6 in FIG. 4;

FIG. 7 is an enlarged sectional view taken substantially along line 7—7 in FIG. 4;

FIG. 8 is an elevational view as seen from the right in FIG. 4;

FIG. 9 is an enlarged fragmented view showing an exemplary pivot frame, stinger mounting frame, and actuator;

FIG. 18 is a side elevation view of the linkage as seen from the right in FIG. 15;

FIG. 19 is a side elevation view showing an alternate pivot frame arrangement;

DETAILED DESCRIPTION OF THE PREFERRED EMBODIMENTS

Figure 10:
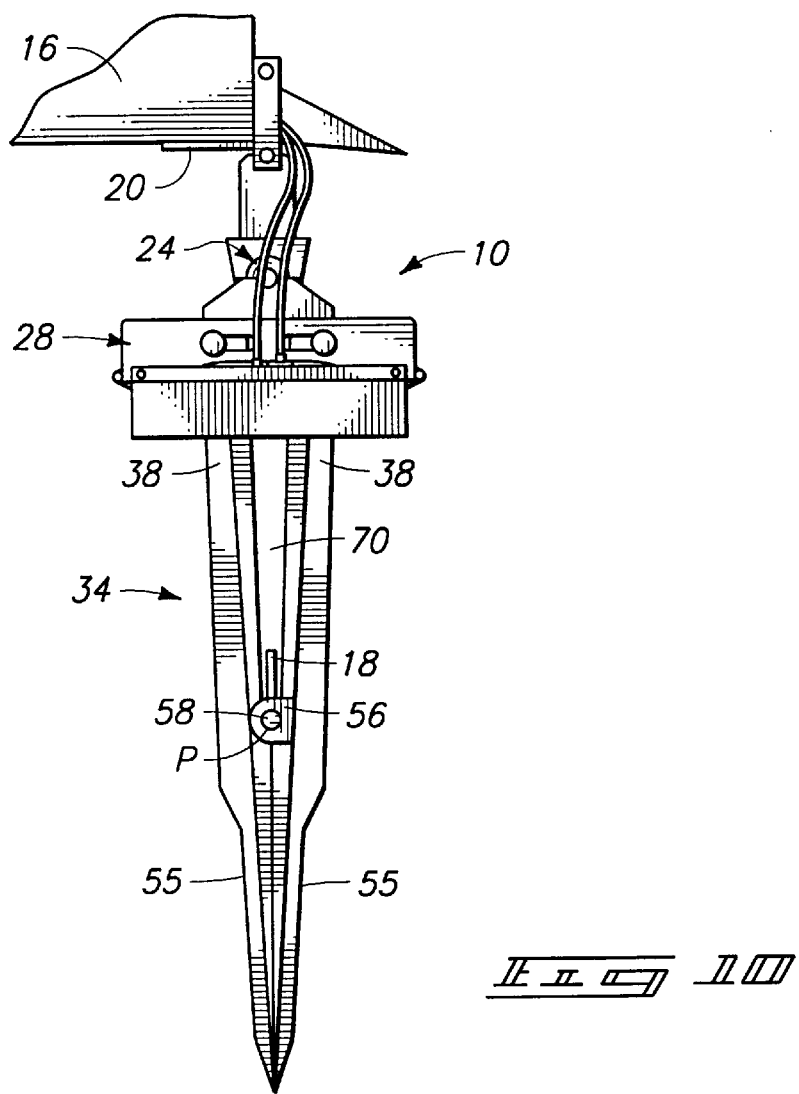
FIGS. 10–13 are fragmented operational views illustrating an exemplary planting operation using the present stinger planter.
Figure 11:
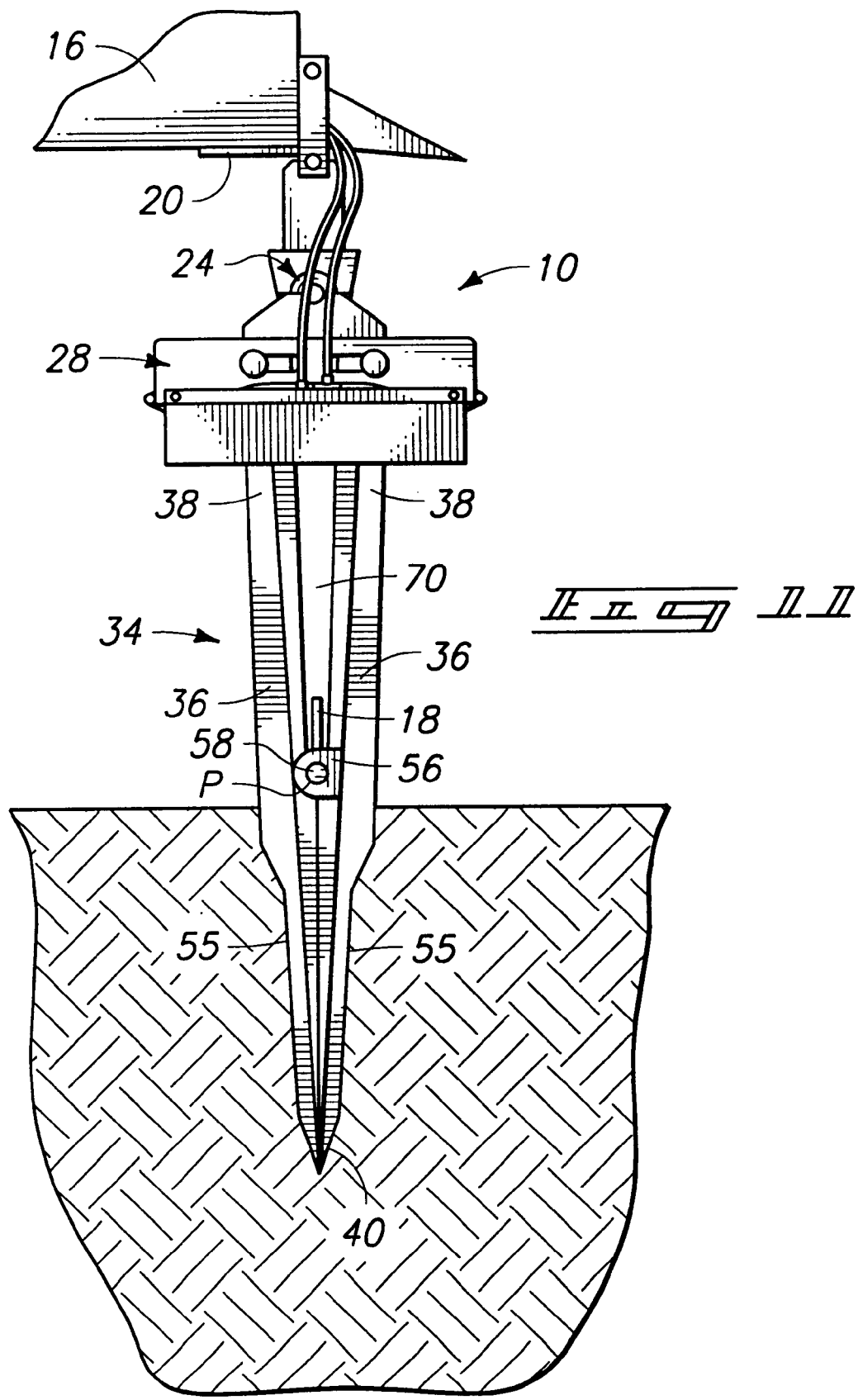

This disclosure of the invention is submitted in furtherance of the constitutional purposes of the U.S. Patent Laws "to promote the progress of science and useful arts" (Article 1, Section 8).

Preferred embodiments of the present expandable stinger planter are designated generally in the drawings by the reference numeral 10. Preferred planters 10 may be produced as attachments that may be mounted to an earth working device such as the excavator 12 shown in FIGS. 1–3. It is advantageous that the planter 10 be adapted for mounting to the end of an excavator type boom 14 to facilitate planting operations at locations remote from the excavator chassis.

The present planter 10 may be mounted an excavator bucket 16, without requiring modification of the bucket other than possibly holes drilled for mounting bolts. The planter is simply secured to the bucket end and can thereby be positioned through use of the existing bucket positioning controls provided in the excavator. Further, the drive components provided within the planter may be connected to appropriate existing power sources supplied by the excavator.

It is noted that the present planter 10 could alternatively be manufactured as an integral part of an elongated boom on an otherwise conventional excavator. In such circumstances, the bucket would simply be replaced by the present planter 10 at the boom end.

It is further noted that the present planter and process may be used to place plants which may include plant cuttings (such as tree whips) or root stock (such as tree seedlings). The planter and process may be used to set the selected plants deep into soil or other plant media.

GENERAL ASPECTS OF THE INVENTION

Before describing various exemplary elements and steps of the preferred invention in further detail, general descriptions will be given for each of several aspects of the invention. Like reference numerals will be used to identify generally similar elements of the various aspects.

In a first general aspect of the invention, an expandable stinger planter 10 is provided which includes a base frame 20 and a pivot frame 24 mounted to the base frame 20 for pivotal movement thereon about multiple pivot axes. A stinger 34, comprised of a pair of elongated probes 36, is mounted to the pivot frame 24 and extends to bottom ends 40. A stinger mounting frame 28 is operatively mounted between the pivot frame 24 and at least one of the elongated probes 36. An actuator 60 on the stinger mounting frame 28 is operable to shift the bottom ends 40 relative to one another between a closed position wherein the bottom ends 40 are closed together, and an open position wherein the bottom ends 40 are opened and form a plant discharge opening 42. An internal plant receiving receptacle 44 is provided within the probes 36 and is open to the plant discharge opening 42 at the open position whereby a plant 18 placed in the plant receiving receptacle 44 may be discharged through the plant discharge opening 42.

In another aspect of the invention (exemplified by FIGS. 19–21), the expandable stinger planter 10 is provided for attachment to an excavator type boom 14. The stinger planter 10 includes a base frame 20 which is configured to be secured to the excavator type boom 14, and a pivot frame 24 mounted to the base frame 20. The pivot frame 24 defines first and second pivot axes X and Y that are approximately perpendicular to one another. The stinger 34 is comprised of a pair of elongated probes 36 secured together for relative pivotal movement about a probe axis P that is transverse to the probes 36. The probes 36 include upper ends 38 that are disposed above the probe axis P. Bottom ends 40 are disposed below the probe axis P. A stinger mounting frame, including a linkage 74 is mounted to the pivot frame 24 at the second pivot axis Y and suspends the stinger 34 from the pivot frame 24 for movement about the first and second axes X, Y. The linkage 74 includes paired four bar links 78, each with four pivots. One pivot 80 is coaxial with the second pivot axis Y. Two pivots 81, 82 are connected at upper ends of the probes, and a remaining pivot 83 is situated between the two pivots 81, 82. An actuator 60 which includes a ram cylinder 63 is mounted between opposed pivots on the linkage such that extension and retraction of the ram cylinder 63 will result in pivotal motion of the probes 36 about the probe axis P between an open position wherein bottom ends 40 of the probes 36 are pivoted away from one another to form a plant discharge opening 42, and a closed position wherein the bottom ends 40 of the probes 36 are pivoted toward one another. The probes 36 form an upwardly open internal plant receiving receptacle 44 that is open to the plant discharge opening 42 at the open position whereby a plant placed in the plant receiving receptacle 44 may be discharged through the plant discharge opening 42.

In a still further aspect, the present invention is embodied in an expandable stinger planter 10 that includes an excavator 12. A boom 14 on the excavator 10 extends to an outward boom end 15, and a base frame 20 is secured to the outward boom end 15. A pivot frame 24 is mounted to the base frame 20 and defines a substantially horizontal first pivot axis X and a substantially horizontal second pivot axis Y that is approximately perpendicular to the first pivot axis X. A stinger 34 is comprised of a pair of elongated probes 36 secured together for relative pivotal movement about a probe axis P that is transverse to the probes 36. The probes 36 include upper ends 38 disposed above the probe axis P and bottom ends 40 disposed below the probe axis P. A stinger mounting frame is comprised of linkage 74 mounted to the pivot frame. The linkage 74 includes paired four bar linkages 78, each with four pivots 80, 81, 82, 83 one pivot 80 of which is located on the pivot frame, two pivots 81, 82 of which are connected at upper ends of the probes 36, and a remaining pivot 83 is situated between the two pivots 81, 82. The actuator 60 in this aspect is comprised of a ram cylinder 63 mounted between the one pivot 80 and the remaining pivot 83 such that extension and retraction of the ram cylinder 62 will result in pivotal motion of the probes 36 about the probe axis P between an open position wherein bottom ends 40 of the probes 36 are pivoted away from one another to form a plant discharge opening 42, and a closed position wherein the bottom ends 40 of the probes 36 are pivoted toward one another. The probes 36 form an upwardly open internal plant receiving receptacle 44 that is open to the plant discharge opening 42 at the open position whereby a plant 18 placed in the plant receiving receptacle 44 may be discharged through the plant discharge opening 42.

In a still further aspect, the present invention is embodied in a planting process, comprising a number of steps including mounting a base frame 20 to a boom 14 of a boom type excavator 12, and providing a pivot frame 24 on the base frame 20 for pivotal movement thereon about multiple pivot axes. Another step involves suspending a stinger 34 from the pivot frame 24, the stinger 34 being comprised of a pair of elongated probes 36 extending to bottom ends 40 that pivot on a probe axis P between an open position wherein the bottom ends are pivoted apart to form a plant discharge opening 42, and a closed position wherein the probe ends 40 are closed together. A further step includes placing a plant 18 between the bottom ends 40 of the probes 36 in the closed position and operating the boom 14 to drive the bottom ends 40 of the probes into a planting media. Other steps include moving the probes 36 to the open position and lifting the probes 36 in the open position from the planting media while leaving the plant 18 in the planting media.

PREFERRED EMBODIMENTS

In preferred embodiments, the base frame 20 is configured to be secured to an excavator type boom 14. It is noted that the base frame 20 may be provided in alternate forms to facilitate mounting to various forms of booms, buckets, or other boom end hardware on a conventional excavator or related machine. The base frame 20 may be releasably attached to the boom 14 or bucket 16 using conventional fasteners such as bolts, clamps, or other fasteners well known in the fastening art as will be readily realized by those of ordinary skill in the art.

In preferred forms, the pivot frame 24 is mounted to the base frame 20. It is advantageous that the pivot frame 24 include a form of ball joint type joint (FIG. 4), forms of universal joints (FIGS. 14 and 20), or other pivot link arrangement that will permit relatively free pivotal movement of the planter 10 about multiple axes below the base frame 20. It is preferable that the pivot frame 24 allow the planter 10 to pivot about at least two angularly offset pivot axes X and Y just below the base frame to allow the operator a wide selection of penetration angles for the planter 10. This capability may be understood by comparing FIGS. 1 and 3.

In the example shown by FIGS. 1–13, the pivot frame 24 includes a ball type joint 23 that may be of a conventional ball and socket construction. The ball joint 23 (see FIGS. 8 and 9) will allow the planter will to pivot relatively freely about axes (including, but not limited to, axes X and Y) that intersect at the center of the ball joint 23.

In the example shown by FIGS. 14–18, the pivot frame 24 is a "U" joint configuration with opposed clevis members 25, 26 joined by elevationally spaced pins 29, 27 that are mounted to a central block 30 and define the first and second pivot axes X and Y, which are preferably substantially perpendicular to one another. The "" joint will allow pivotal motion much in the same manner as the ball joint 23. The two defined first and second pivot axes X and Y are elevationally spaced, but the resulting pivot action of the stinger 34 will be substantially similar to that allowed for by the ball type joint.

Figure 20:
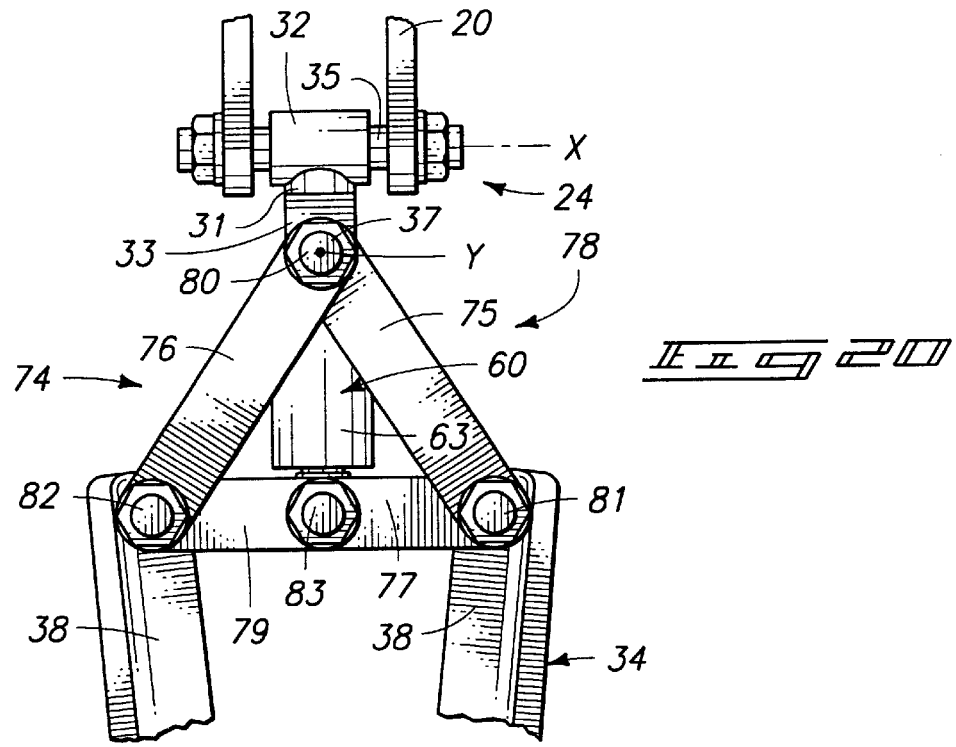
FIG. 20 is a front elevation view of the alternate form shown in FIG. 19 with top ends of the probes in positions corresponding to the closed position of the bottom probe ends.
Figure 21:
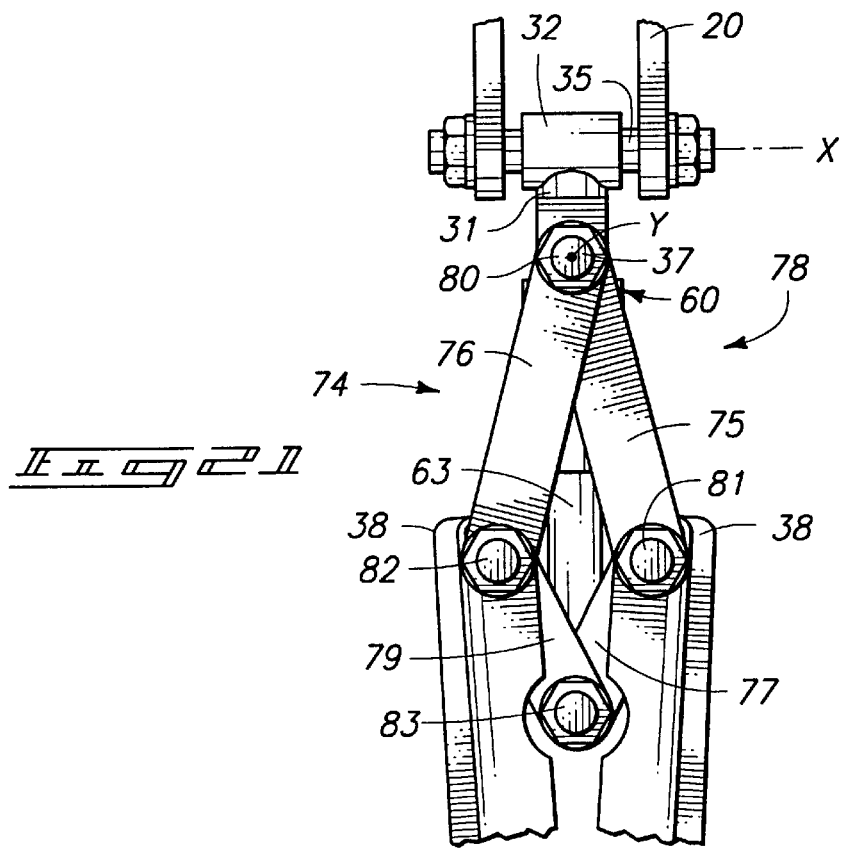
FIG. 21 is a view similar to FIG. 20 only showing the pivot frame of FIGS. 19 and 20, but with the linkage operating to open the probes.

Pivot capability is also afforded by the exemplary form of pivot frame illustrated in FIGS. 19–21. Here a central member 31 is used that is not formed as a block, but instead includes elevationally spaced cross journals 32, 33 and respective pins 35, 37 are mounted to the base frame 20 above and the stinger mounting frame 28 below.

In forms of the present planter as exemplified in FIGS. 1–13, the stinger mounting frame 28 may include a stinger support base formed of rigid metal such as steel with a top plate 21 secured to the pivot frame 24 and side plates 22 depending downwardly to form a channel for receiving and suspending upper ends 38 of the stinger probes 36. The side plates also function to protect internal actuator drive components. In the embodiments exemplified in FIGS. 14–21, the stinger mounting frame may comprise the linkage 74, which may be mounted between the pivot frame and stinger.

Further details of exemplary stinger mounting frames 28 and connections between the pivot frame and stinger may be better understood, following a more detailed description of an exemplary stinger.

A preferred stinger 34 is comprised of a pair of elongated probes 36 that are preferably fabricated of rigid material of a type commonly used in ground working tools. The probes extend from top ends 38 that are mounted to the stinger mounting frame 28 to bottom ends 40 that are configured for penetration of a planting media. In a preferred form, the probes 36 together include a length dimension between the top and bottom ends 38, 40 of approximately eight feet. Probes 36 of this length have been successfully used to set plants 18 including rooted stock and long plant whips (cuttings).

Bottom ends 40 of the probes, which are normally held in a closed media penetrating condition, are separable to form a plant discharge opening 42. The bottom probe ends 40 are held in the closed position during planting media penetration, then may be selectively spread to allow discharge of a plant 18 through the discharge opening 42.

The probes 36 also define an upwardly open internal plant receiving receptacle 44 (see FIG. 6). The receptacle 44 is preferably formed by facing recesses that are centrally located between the probes above the bottom ends 40. Plants may be manually inserted into the receptacle 44 and are protected by the probes during penetration. However, the receptacle 44 will open through the plant discharge opening 42 once the probes are shifted to the open position. At this point, the plant 18 may be discharged through the plant discharge opening 42 as the open probes are lifted.

The probes 36 each include planting media penetrating portions 46 with facing surfaces 48, 50 that are in substantial flush engagement with one another at the closed position. In preferred forms, the surfaces 48, 50 include formed edge surfaces 52, 54 (FIG. 7) that are configured to nest together in a partial overlapping relationship at the closed position. This is done to reinforce the probes during penetration and prevent bending or misalignment. The receptacle 44 is preferably formed along the penetrating portions 46 between the edge surfaces 52, 54.

Also in preferred forms, longitudinal reinforcing ribs 55 are welded or otherwise formed along the probes 36 and project outwardly therefrom. The ribs 55 preferably extend the full stinger length and add structural rigidity to the probes. The ribs 55 also serve to prevent "shear" or hard packed surfaces of the opening formed by the probes that might otherwise be formed as the probes are inserted and then withdrawn from the ground. It is advantageous that the ribs 55 be tapered to downward points at the bottom probe ends 40 to facilitate penetration.

The probes exemplified herein are substantially mirror images of one another with the exception of the different edge surfaces 52, 54; and overlapping hinge members 56, 58. The preferred hinge members join the probes for pivotal movement, thereby providing a preferred mechanism by which the probes may be shifted between the open and closed positions. It is preferred that the hinge members 56, 58 interfit and define the probe pivot axis P that is located approximately mid-way along the probe length dimension. The probe pivot axis P is preferably transverse to the probe length and positioned so that when the top probe ends 38 are moved together, the bottom ends 40 will move apart (to form the discharge opening 42).

It is noted that the exemplary hinge members are substantially flush with the outside surfaces of the probes so they do not significantly interfere as the probes are inserted into the planting media. Also, the hinge members are situated on opposite sides of the probes, as shown in FIG. 6, leaving the receptacle 44 open and unobstructed for reception and discharge of plants 18 such as whips or root stock.

Preferred forms of the probes also include upper leg portions 68 that extend between the probe pivot axis P and the top ends 38. The upper leg portions are spaced apart when the probes are in the closed positions to form at least one, and preferably two, opposed access openings 70 communicating with the upwardly open internal plant receiving receptacle 44. The openings 70 allow for manual insertion of plants or whips into the receptacle.

Selective movement of the probes between the open and closed positions is implemented at or adjacent the top ends of the probes by way of the stinger mounting frame 28 and actuator 60, examples of which will now be described.

In the embodiment shown in FIGS. 1–13, the stinger mounting frame includes the stinger mounting frame briefly described above, which provides a mount for the top ends 38 of the probes and for the exemplified actuator 60, which is disposed between the side plates 22 of the support.

The actuator 60 is provided to selectively pivot at least one of the probes about the probe pivot axis between the open and closed positions. Forms of the actuator may function to forcibly shift both probes 36 about the probe pivot axis.

The preferred actuator exemplified in FIGS. 1–13 is comprised of two ram cylinders 62 that are mounted between the probe top ends 38 and the stinger mounting frame 28. The ram cylinders 62 may be connected to appropriate hydraulic pressure sources and controls provided in the excavator for selective operation to extend and retract, thereby causing corresponding movement of the bottom probe ends 40 between the open and closed positions.

As shown in FIG. 9, the probe top ends 38 are slidably mounted to the stinger mounting frame 28. Horizontal slots 64 are formed in the side walls 22 of the stinger mounting frame 28 for this purpose, guiding rollers 66 that are mounted to the probe top ends 38. The slots 64 permit lateral motion of the rollers 66 and probe top ends as effected by the ram cylinders 62.

It is understood that in the illustrated examples, a single cylinder could be mounted between the upper probe ends to effect the desired probe movement between the open and closed positions. Other actuators might also be used that are not shown in the present drawings, but that fall within the scope of the appended claims. For example, the illustrated cylinder 63 or cylinders 62 could be replaced with electric or hydraulic jack screws, linear actuators, gear sets, or other drive arrangements not shown, but which could be used to force selective pivotal motion of the probes 36 about the probe axis P.

Further examples of the stinger mounting frame 28 may include linkage 74 as exemplified in FIGS. 14–21, which may be used in place of the frame components shown in FIGS. 1–13. The linkage 74 may be connected between the top probe ends and the pivot frame 24 to guide pivotal movement of the probes between the open and closed positions in response to extension and retraction of the cylinder.

In general, the linkage 74 includes at least two bar links 75, 76 that are pivotably joined to the pivot frame and the top probe ends 38. The bar links 75, 76 may be used to suspend the probes and to allow pivotal motion of the probes about the probe pivot axis P.

The linkage 74 exemplified by FIGS. 14–21, includes at least four elongated bar links 75, 76 and 77, 79 joined at the four pivots 80–83. In the examples shown, two pairs of the four bar links, each with four pivots are shown. The two pairs of four bar links are substantially identical and are spaced apart to opposite sides of the actuator, with substantially coaxial pivots. Thus, description of one set of bar links will suffice for description of the other.

One pivot 80 joins the bar links 75, 76 to the pivot frame 24 and two pivots 81, 82 join the opposite ends of bar links 75, 76 to the probes at their top ends 38. The bar links 77, 79 are joined together at the remaining pivot 83 and extend in opposite directions from pivot 83 to the pivots 81, 82. Preferably the bar links 75, 76 are of equal length and are rigid. Likewise, the bar links 77, 79 are Preferably of equal length (but not necessarily equal to the length of bar links 75, 76) and are likewise rigid. The pivots 80–83 may be comprised of bolts or pins that join ends of the bars for pivotal movement and define axes that are preferably parallel to one another and that are preferably parallel to the probe pivot axis P.

Figure 14:
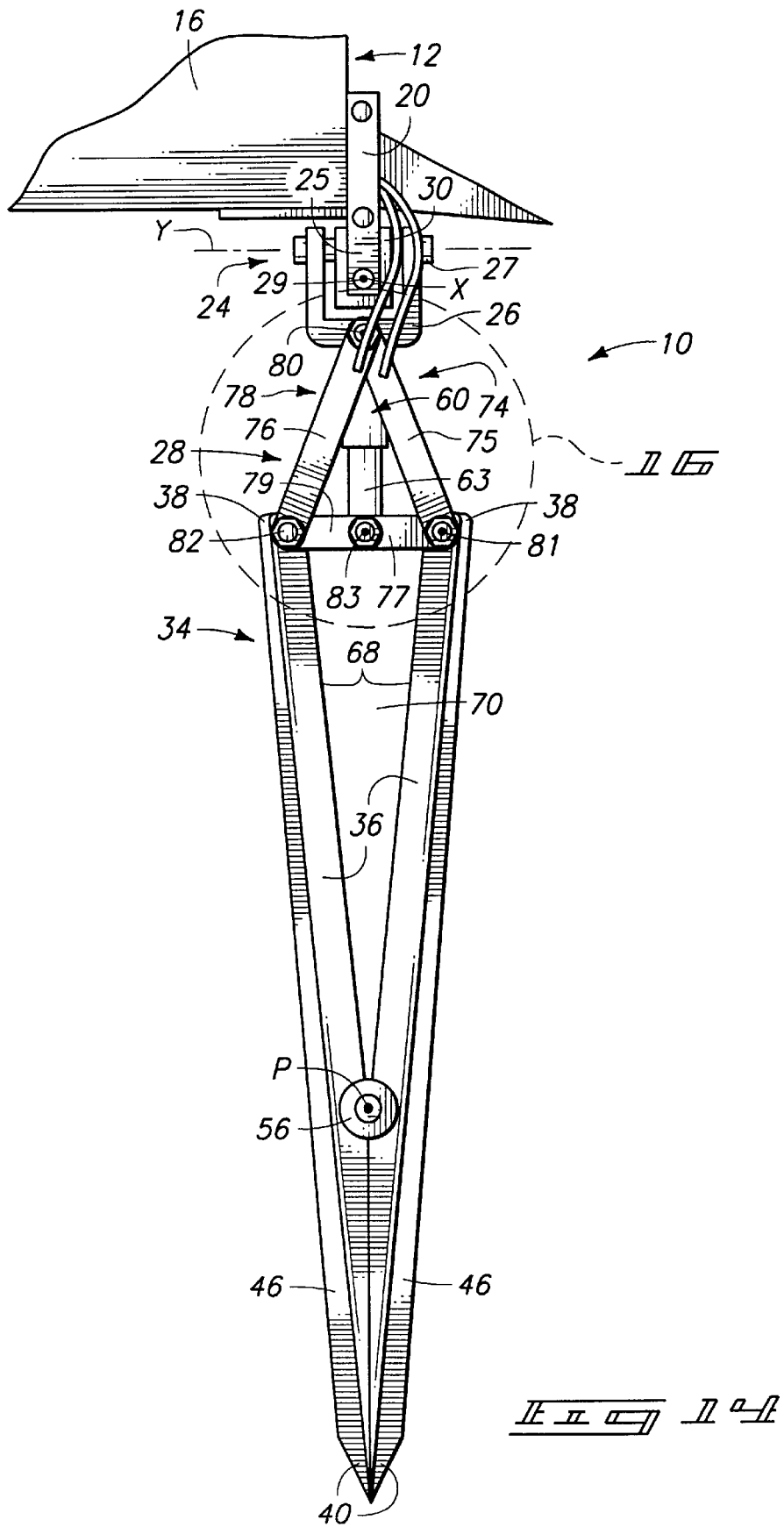
FIG. 14 is an elevational view of a stinger with a linkage connecting the stinger a pivot frame.
Figure 15:
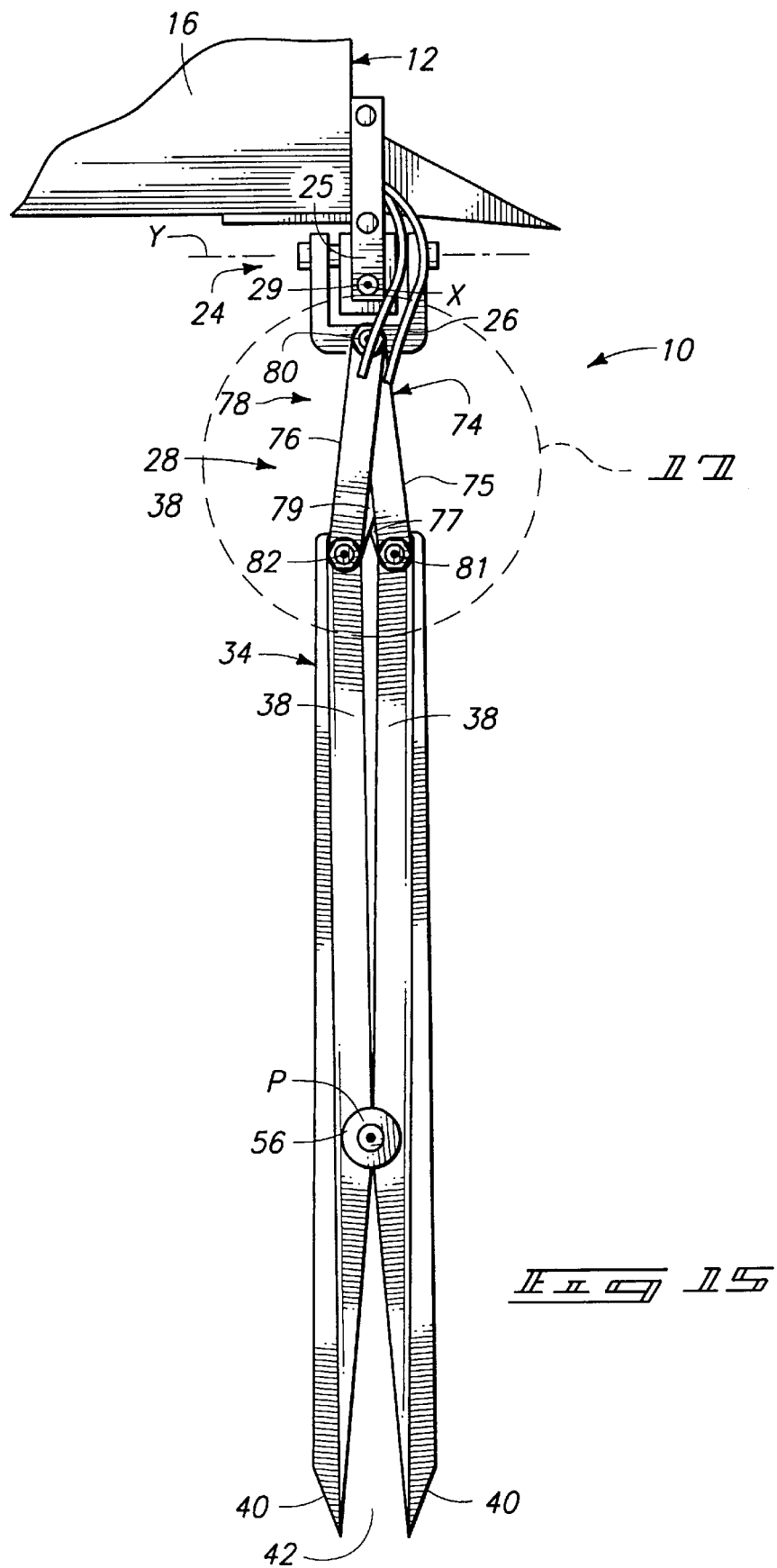
FIG. 15 is an elevational view of the stinger shown in FIG. 14 only with the linkage in a stinger opening position.
Figure 16:
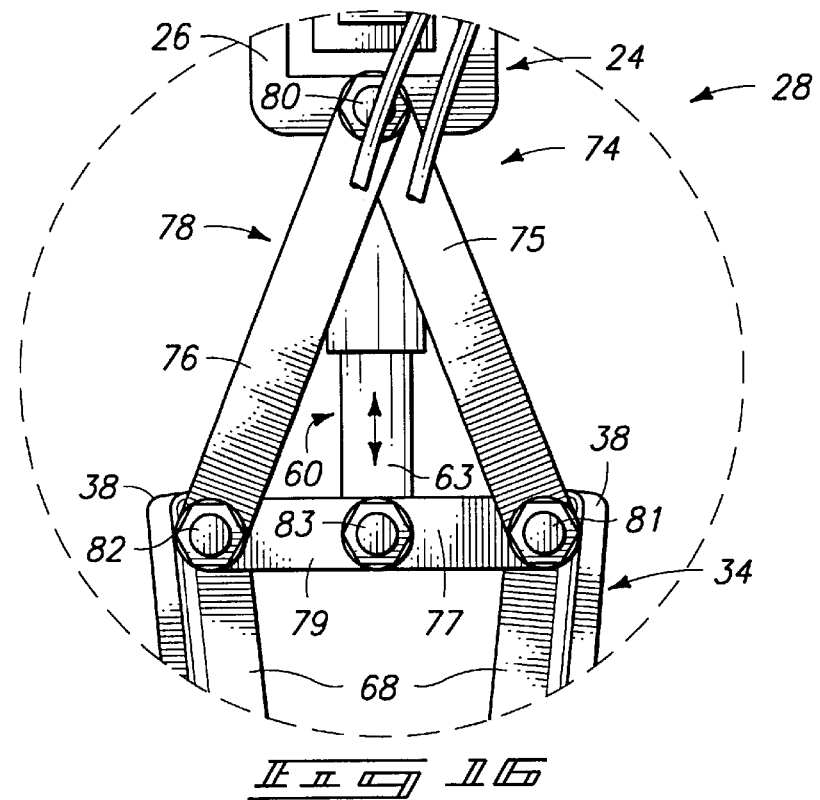
FIG. 16 is an enlarged view of the area identified in FIG. 14 by the numeral 16.
Figure 17:
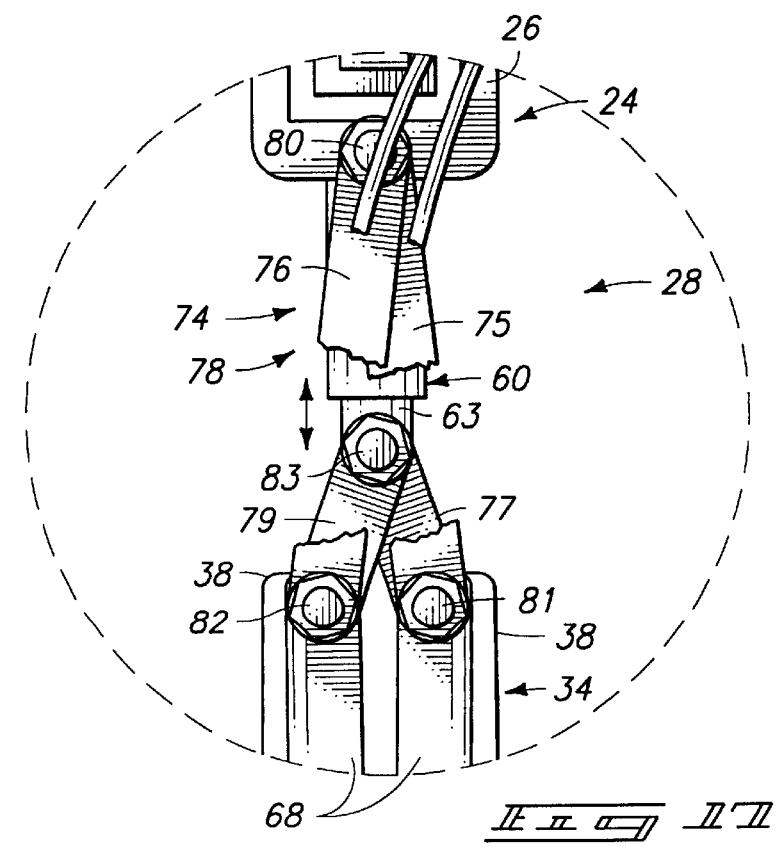
FIG. 17 is an enlarged view of the area identified in FIG. 15 by the numeral 17.

As shown by the examples illustrated in FIGS. 14 and 20, the bar links of each pair form a polygon that is substantially bisected by the actuator. The polygonal shape may be considered as two opposed toggle joints on opposite sides of the actuator 60, that pivot in response to extension and retraction of the actuator 60, causing the probes to pivot between the open and closed condition.

It is noted that in the examples shown by FIGS. 14–21, the actuator is comprised of a single ram cylinder 63, connected between pivots 80 and 83, where two cylinders 62 are shown in the examples illustrated by FIGS. 1–13. The single cylinder 63 basically accomplishes the same effect and purpose as the two cylinders 62 to open and close the probes.

The ram cylinder 63 is preferably longitudinally oriented with respect to the elongated probes, and is centered between the top probe ends 38. The top end of the cylinder is mounted to the pivot frame 20, and the bottom end is mounted to the linkage, preferably at the pivot 83. Extension of the cylinder may either cause the probes to open or close. In the example illustrated by FIGS. 16 and 17, retraction of the cylinder will cause the probes to open (compare FIGS. 14 and 15). In the example illustrated by FIGS. 20 and 21, extension of the cylinder will cause the probes to open.

The preferred process for planting and operation of the illustrated forms of the present invention may be understood with reference to FIGS. 10–13.

Before operation, the planting process may begin by mounting the base frame 20 to the excavator boom. This is accomplished preferably by bolting or otherwise securing the base frame 20 to the boom end 15 or to the typically present excavator bucket 16. The pivot frame for pivotal movement thereon about multiple pivot axes as discussed above, and the stinger is suspended from the pivot frame. Appropriate connections are made at this point to the excavator power system and controls to permit operator control of the actuator 60, so the operator may selectively control the actuator to shift the probes between the open and closed positions.

The excavator 12 operator may elect to move the excavator using the conventional controls and drive mechanisms, to an area to be planted. The boom 14 is then shifted to a position for easy access by an individual who may perform the step of placing a plant 18 between the bottom ends of the probes 36 (which are presently in the closed position). This is accomplished by simply inserting the plant 18 through one of the access openings 70, and allowing the plant 18 to drop into place within the receptacle 44 between the closed probes. The closed bottom ends 40 of the probes 36 will prevent the plant 18 from dropping, and the rigid lower parts of the probes will protect the plant.

The next step may involve operating the boom to drive the bottom ends of the probes into a planting media (see FIGS. 1 and 3).

Before this is done, the operator may use the conventional controls in the excavator to swing the boom and planter to a selected planting location. The boom is then lowered under power, driving the probes deep into the planting media, such as the ground illustrated FIG. 11.

If rocks are encountered, the user may shift the boom to angle the probe off vertical, while continuing downward pressure. FIG. 1 exemplifies such a condition where rocks were encountered and the boom was shifted to gain penetration. This function is enabled by provision of the pivot frame 24, which will allow the planter to be shifted angularly while downward pressure is applied.

Figure 12:
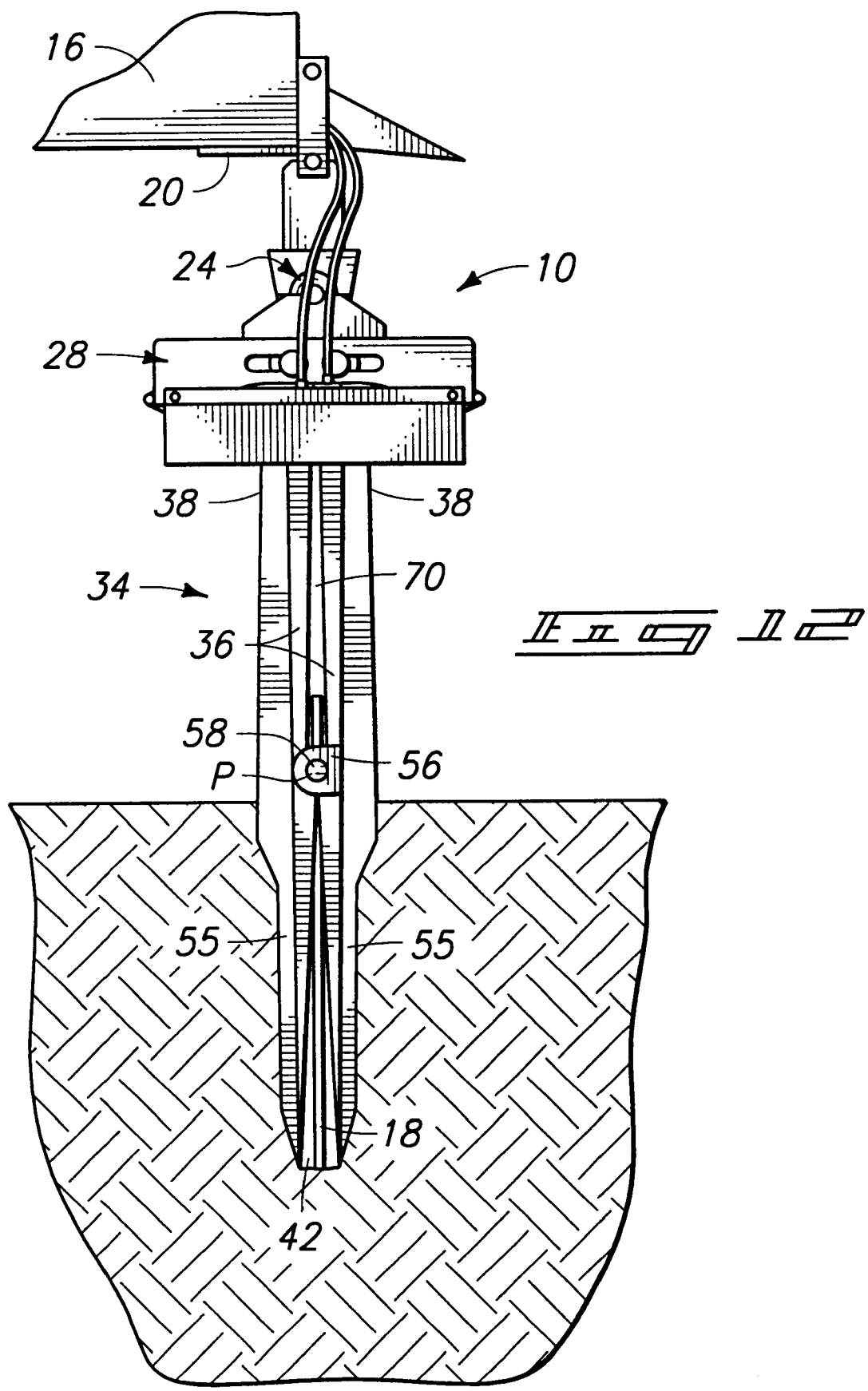

Once the probes are driven to a desired depth, the step of moving the probes to the open position may be performed, followed by the step of lifting the probes while in the open position from the planting media while leaving the plant in the planting media. To do this, appropriate controls may be operated to activate the actuator 60, causing the probes to open (FIG. 12). The bottom probe ends will separate, forming the discharge opening 42 and allow the plant 18 to drop.

Figure 13:
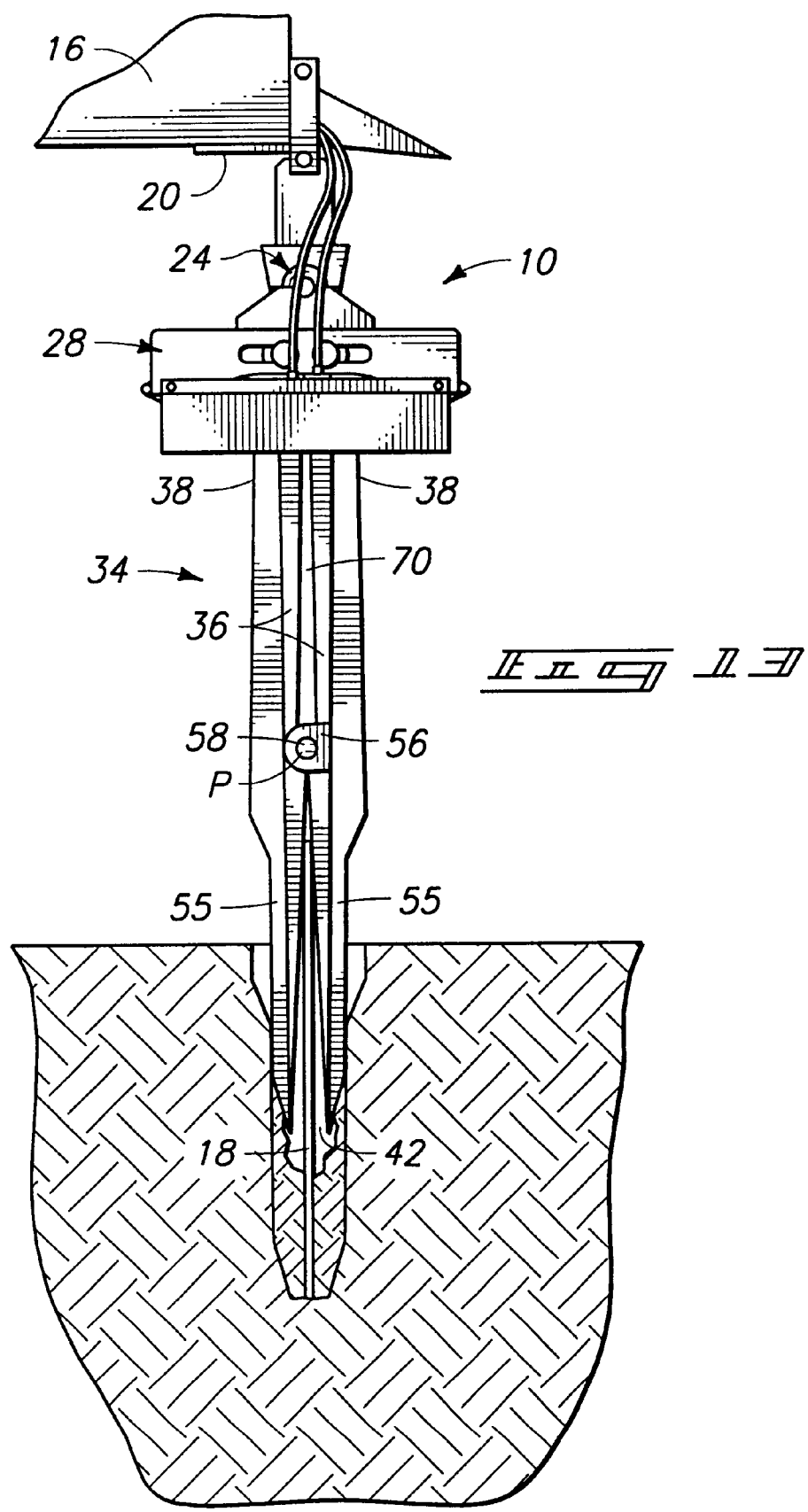

The operator may use appropriate controls in the excavator 12 to raise the boom 14 and thereby lift the probe upwardly. It is noted that this step is accomplished with the probes in the open condition. The plant 18 will thus remain elevationally stationary as the probes are raised (FIG. 13).

It is noted that the ground or other planting media at the bottom probe ends is pushed laterally away, enlarging the opening. Then, as the probes are lifted (while being held in the open position) the longitudinal ribs 55 may function to break up the compressed media and allow the now loosened media to fill the hole. Thus "shear" or compaction of the planting media about walls of the opening is avoided and the plant 18 will have a better chance for successful starting in the surrounding loosened media.

Once the probes have been pulled upwardly free of the media and the top end of the plant 18 has cleared the probe bottom ends 40, the operator may operate the actuator 60 to close the probes in preparation for receiving the next plant.

The above planting process may be repeated as often as desired with the excavator basically remaining in one position. When an adequate number of plants have been placed, the user may elect to move the excavator to another location where the above steps may be repeated.

It may be understood from the above that the present invention provides a mechanized stinger planter that can be attached to a boom for remote operation, so difficult terrain can be planted from adjacent accessible areas. In fact, FIG. 1 shows such operation; where the probes are used to plant along a rocky riparian hillside, even below water.

It may be further understood that the present planter may be used for deep planting operations for planting whips and root crop to avoid wash out and damage from animals. The planting depth is selected by the operator, and may be such that only a small part of the overall plant length is exposed above the surface of the planting media. The plant 18 is thus protected against wash out. Further, even if foraging animals eat the tops of the plants, the bulk of the plant 18 will remain below grade and will stand a good chance to take root and survive.

As may also be understood from the above, the present planter may be operated to minimize or eliminate "shear wall" packing in planting holes and allow loose soil to backfill the opening produced by the probes to promote healthy plant growth. This is an advantage, as described above, provided by the ribs 55 which break up the compacted soil as the probes are lifted.

In compliance with the statute, the invention has been described in language more or less specific as to structural and methodical features. It is to be understood, however, that the invention is not limited to the specific features shown and described, since the means therein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An expandable stinger planter, comprising:

a base frame;

a pivot frame mounted to the base frame for pivotal movement thereon about multiple pivot axes;

a stinger comprised of a pair of elongated probes mounted to the pivot frame and extending to bottom ends;

a stinger mounting frame operatively positioned between the pivot frame and at least one of the elongated probes;

an actuator on the stinger mounting frame and operable to shift the bottom ends relative to one another between a closed position wherein the bottom ends are closed together, and an open position wherein the bottom ends are opened and form a plant discharge opening; and an internal plant receiving receptacle within the probes that is open to the plant discharge opening at the open position whereby a plant placed in the plant receiving receptacle may be discharged through the plant discharge opening.

2. An expandable stinger planter as defined by claim 1 wherein the pivot frame includes a universal joint secured between the stinger and base frame, and wherein the pivot axes are substantially perpendicular to one another.

3. An expandable stinger planter as defined by claim 1 wherein the pivot frame is secured between the stinger and base frame about elevationally spaced pivot axes and wherein the stinger is substantially free to pivot about the pivot axes.

4. An expandable stinger planter as defined by claim 1 wherein the stinger mounting frame includes a linkage mounted between the stinger and pivot frame and wherein the actuator includes a ram cylinder mounted to the linkage.

5. An expandable stinger planter as defined by claim 1 wherein the stinger mounting frame includes a linkage including at least two bar links pivotably joined to the pivot frame and the probes at top ends thereof.

6. An expandable stinger planter as defined by claim 1 wherein the stinger mounting frame is comprised of a linkage having four elongated bar links joined at four pivots, with one pivot joined to the pivot frame, two pivots joined to the probes, and a remaining pivot positioned between the two pivots;

wherein the actuator is comprised of a ram cylinder connected between the one pivot and the remaining pivot.

7. An expandable stinger planter as defined by claim 1 further comprising reinforcing ribs formed along the probes and that project outwardly therefrom; and wherein the ribs and probes taper to pointed ends at the bottom ends of the probes.

8. An expandable stinger planter as defined by claim 1 wherein the probes include top ends mounted to the stinger mounting frame.

9. An expandable stinger planter as defined by claim 1 wherein the probes are pivotably mounted to one another about a probe pivot axis that is substantially normal to the probes.

10. An expandable stinger planter as defined by claim 1 wherein the probes are pivotably mounted to one another about a probe pivot axis and wherein the actuator includes at least one ram cylinder that is operable to extend and retract to pivot the bottom ends of the probes between the open and closed positions.

11. An expandable stinger planter as defined by claim 1, wherein the probes include a length dimension and are joined for pivotal movement at a probe pivot axis that is located approximately mid-way along the length dimension.

12. An expandable stinger planter as defined by claim 1, wherein the probes are joined at a probe pivot axis for pivotal movement relative to one another and further include penetrating portions with facing surfaces extending approximately from the probe pivot axis to the bottom ends;

wherein the penetrating portions are in substantial flush engagement with one another at the closed position; and wherein the plant receiving receptacle is formed as recesses formed in the facing surfaces.

13. An expandable stinger planter as defined by claim 1, wherein the probes include penetrating portions with facing surfaces that are in substantial flush engagement with one another at the closed position.

14. An expandable stinger planter as defined by claim 1, wherein the probes are connected to one another for pivotal movement about a probe pivot axis;

wherein the probes include penetrating portions with facing surfaces that extend between the probe pivot axis and the bottom ends; and wherein the probes also include upper leg portions extending between the probe pivot axis and top ends of the probes, the upper leg portions being spaced apart to form an access opening communicating with the upwardly open internal plant receiving receptacle.

15. An expandable stinger planter as defined by claim 1, wherein each of the probes includes a penetrating portion;

wherein the penetrating portions include facing surfaces that are configured to nest together in a partial overlapping relationship at the closed position.

16. An expandable stinger planter as defined by claim 1, wherein each of the probes includes a penetrating portion;

wherein the penetrating portions include facing surfaces that are configured to nest together in a partial overlapping relationship at the closed position; and further comprising longitudinal reinforcing ribs formed along the probes and that project outwardly therefrom.

17. An expandable stinger planter for attachment to an excavator type boom, comprising:

a base frame configured to be secured to the excavator type boom;

a pivot frame mounted to the base frame and defining first and second pivot axes that are approximately perpendicular to one another;

a stinger comprised of a pair of elongated probes secured together for relative pivotal movement about a probe axis that is transverse to the probes;

wherein the probes include upper ends disposed above the probe axis and bottom ends disposed below the probe axis;

a stinger mounting frame comprised of a linkage mounted to the pivot frame at the second pivot axis and suspending the stinger from the pivot frame for movement about the first and second axes;

wherein the linkage includes paired four bar links, each with four pivots, one pivot of which is coaxial with the second pivot axis, two pivots of which are connected at upper ends of the probes, and a remaining pivot which is situated between the two pivots;

an actuator comprised of a ram cylinder mounted between opposed pivots on the linkage such that extension and retraction of the ram cylinder will result in pivotal motion of the probes about the probe axis between an open position wherein the bottom ends of the probes are pivoted away from one another to form a plant discharge opening, and a closed position wherein the bottom ends of the probes are pivoted toward one another; and wherein the probes form an upwardly open internal plant receiving receptacle that is open to the plant discharge opening at the open position whereby a plant placed in the plant receiving receptacle may be discharged through the plant discharge opening.

18. An expandable stinger planter as defined by claim 17 wherein the pivots move about pivot axes and wherein the probe axis is substantially parallel to the pivot axes.

19. An expandable stinger planter as defined by claim 17 wherein the paired four bar links form polygons that are substantially bisected by the ram cylinder.

20. An expandable stinger planter as defined by claim 17 wherein the ram cylinder is longitudinally oriented with respect to the elongated probes.

21. An expandable stinger planter, comprising:

an excavator;

a boom on the excavator extending to an outward boom end;

a base frame configured secured to the outward boom end;

a pivot frame mounted to the base frame and defining a substantially horizontal first pivot axis and a substantially horizontal second pivot axis that is approximately perpendicular to the first pivot axis;

a stinger comprised of a pair of elongated probes secured together for relative pivotal movement about a probe axis that is transverse to the probes;

wherein the probes include upper ends disposed above the probe axis and bottom ends disposed below the probe axis;

a stinger mounting frame comprised of a linkage mounted to the pivot frame;

wherein the linkage includes paired four bar links, each with four pivots, one pivot of which is located on the pivot frame, two pivots of which are connected at upper ends of the probes, and a remaining pivot which is situated between the two pivots;

an actuator comprised of a ram cylinder mounted between the one pivot and the remaining pivot such that extension and retraction of the ram cylinder will result in pivotal motion of the probes about the probe axis between an open position wherein bottom ends of the probes are pivoted away from one another to form a plant discharge opening, and a closed position wherein the bottom ends of the probes are pivoted toward one another; and wherein the probes form an upwardly open internal plant receiving receptacle that is open to the plant discharge opening at the open position whereby a plant placed in the plant receiving receptacle may be discharged through the plant discharge opening.

22. A planting process, comprising the steps of:

mounting a base frame to a boom of a boom type excavator;

providing a pivot frame on the base frame for pivotal movement thereon about multiple pivot axes;

suspending a stinger from the pivot frame, the stinger being comprised of a pair of elongated probes extending to bottom ends that pivot on a probe axis between an open position wherein the bottom ends are pivoted apart to form a plant discharge opening, and a closed position wherein the probe ends are closed together;

placing a plant between the bottom ends of the probes in the closed position;

operating the boom to drive the bottom ends of the probes into a planting media;

moving the probes to the open position; and lifting the probes in the open position from the planting media while leaving the plant in the planting media.

* * * * *

UNITED STATES PATENT AND TRADEMARK OFFICE
CERTIFICATE OF CORRECTION

PATENT NO.    : 6,341,568 B1  Page 1 of 1
DATED         : January 29, 2002
INVENTOR(S)   : Daniel A. Culley It is certified that error appears in the above-identified patent and that said Letters Patent is hereby corrected as shown below:

Column 1,
Line 43, delete "planting processes," and insert -- planting processes. --

Column 5,
Line 39, delete "The "" joint will allow", and insert -- The "U" joint will allow --.

Column 8,
Line 9, delete "are Preferably of equal", and insert -- are preferably of equal --.
Lines 48-49, "Appropriate connections" was printed on two separate lines; should have been printed on same line as the beginning of a new sentence.

Signed and Sealed this

Fourteenth Day of January, 2003

JAMES E. ROGAN
*Director of the United States Patent and Trademark Office*